US006181430B1

(12) United States Patent
Meyer et al.

(10) Patent No.: US 6,181,430 B1
(45) Date of Patent: Jan. 30, 2001

(54) OPTICAL DEVICE FOR MEASURING A SURFACE CHARACTERISTIC OF AN OBJECT BY MULTI-COLOR INTERFEROMETRY

(75) Inventors: William V. Meyer, Lakewood, OH (US); Anthony E. Smart, Costa Mesa, CA (US)

(73) Assignee: Ohio Aerospace Institute, Brook Park, OH (US)

( * ) Notice: Under 35 U.S.C. 154(b), the term of this patent shall be extended for 0 days.

(21) Appl. No.: 09/270,202

(22) Filed: Mar. 15, 1999

(51) Int. Cl.[7] ............................................. G01B 9/02
(52) U.S. Cl. .................................... 356/495; 356/511
(58) Field of Search ......................... 356/357, 359, 356/360, 349, 351, 489, 495, 511, 512

(56) References Cited

U.S. PATENT DOCUMENTS

| 4,534,649 | 8/1985 | Downs . | |
|---|---|---|---|
| 4,576,479 | 3/1986 | Downs . | |
| 5,127,731 | * 7/1992 | De Groot | 356/359 |
| 5,159,408 | * 10/1992 | Waldenmaier et al. | 356/357 |
| 5,270,560 | 12/1993 | Cheng . | |
| 5,293,215 | * 3/1994 | Pfendler et al. | 356/360 |
| 5,398,113 | 3/1995 | de Groot . | |
| 5,404,221 | 4/1995 | de Groot . | |
| 5,473,434 | 12/1995 | de Groot . | |
| 5,481,360 | 1/1996 | Fujita . | |
| 5,488,477 | 1/1996 | de Groot . | |
| 5,526,116 | 6/1996 | de Groot . | |
| 5,671,050 | 9/1997 | de Groot . | |
| 5,708,279 | 1/1998 | Cheng . | |

OTHER PUBLICATIONS

Article entitled "Three–Wavelength Interferometry" from the Internet.
"Interometric Laser Profilometer for Rough Surfaces," de Groot, 1991.
"Use of Multimode Short–External–Cavity Laser Diode for Absolute–Distance Interferometry," de Groot, 1993.
"Synthetic Wavelength Stabilization for Two–Color Laser–Diode Interferometry," de Groot, 1991.
"Three Color Laser Diode Interferometer," de Groot, 1991.
"Digital Wave–front Measuring Interferometry: Some Systematic Error Sources," Schwider, 1983.
"Progress In Absolute Distance Interferometry," Gillard, 1983.
"Integrated Acoustically–tuned Optical Filters for Filtering and Switching Applications," Smith, 1991.
"Sampling of Quadrature–Phase Quantities," Harnefors 1995.
"Measurement of the Profiles of 'Super–Smooth' Surfaces Using Optical Interferometry," Downs 1988.
"Optical System For Measuring the Profiles of Super–Smooth Surfaces," Downs 1985.
"A Proposed Design for an Optical Interferometer With Sub–nanometric Resolution," Downs 1990.
"Optical Techniques to Solve the Signal Fading Problem in Fiber Interferometers," Sheem, 1982.
"Optical Ranging By Wavelength Multiplexed Interferometry," Williams 1986.
"Absolute Optical Ranging with 200–nm Resolution," Williams 1989.
"Multiple–wavelength Phase–shifting Interferometry," Cheng 1985.
"Synthetic–Heterodyne Interferometric Demodulation," Cole, 1982.

* cited by examiner

Primary Examiner—Samuel A. Turner
(74) Attorney, Agent, or Firm—Vickers, Daniels & Young (57) ABSTRACT

An interferometer having a light beam source that produces a plurality of separate and distinct wavelengths of light. Optic fibers are used to transport the wavelengths of light toward an object surface and to allow light reflected from the object to pass through a polarizer to improve the polarization ratio of the reflected light to determine a characteristic of the object surface.

41 Claims, 3 Drawing Sheets

OPTICAL DEVICE FOR MEASURING A SURFACE CHARACTERISTIC OF AN OBJECT BY MULTI-COLOR INTERFEROMETRY

This invention was made with government support under contract NCC 3419 awarded by NASA.

The invention relates to the art of interferometry, and more particularly to multi-color interferometry for measuring the position of the surface of a solid or liquid object.

BACKGROUND OF THE INVENTION

Interferometers are widely used for measuring the profiles of smooth surfaces. In these devices, interfering beams are reflected from different areas on a solid surface and interferometric techniques are used to detect variations in surface height by measuring the path differences between the two interfering beams as the beams are moved across the solid surface. The interferometry transforms phase information encoded on a beam of coherent light into an intensity modulation that can be detected by conventional "square-law" detectors. The encoded information is typically a representation of fringes, in time or space, whose repeat frequency is determined by the period of one cycle of the optical wavelength. The fringe separation can be scaled somewhat by the geometry of the apparatus, but in general one fringe cannot be distinguished from another. As a result, it is not practical to identify a single fringe uniquely. This problem can be partially remedied when the bandwidth of the light is selected to give the highest contrast in the "zero-order" fringe, and which the contrast is reducing in either direction. If the contrast of the fringe reduces rapidly enough to give unambiguous identification, the distance over which a useful measurement can be discriminated is proportionally altered (i.e. reduced or increased).

In addition to the fringe detection problems, typical interferometers are notoriously difficult to keep stable. Since the optical paths of light in different routes are the source of the desired measurement, any differences arising from effects other than that to be measured are ruinous to the accuracy. These include mechanical vibration; thermal expansion; intensity modulation; birefringence effects; spatial and temporal coherence reduction; optical, mechanical and/or electronic drift; and/or other unanticipated operational problems.

Previous interferometers have been able to measure relative surface displacements over a limited range. This has made it impossible to contour surfaces containing steps or other discontinuities. Previous interferometers have also used bulk optics for guiding and mixing the light. Bulk optics suffer from alignment, stability and fringe contrast problems.

In view of the deficiencies of present interferometers used to measure relative surface displacement, there is a need for an interferometer that is simple to use, overcomes past stability and fringe contrast problems, and can measure relative surface displacements over a larger range than heretofore.

SUMMARY OF THE INVENTION

The present invention relates to an improved apparatus and method of measuring surface characteristics of solids and liquids, and more particularly, to a multi-color interferometer that measures the absolute displacement and contouring of a solid or liquid.

The invention overcomes the problems associated with alignment, stability and fringe contrast, and provides useful performance in a range of applications and environments not formerly accessible. The invention significantly expands the applicability of an interferometer by overcoming the restricted dynamic range arising from the inability to distinguish between adjacent "fringes", either in time or space. The dynamic range is typically restricted to the physical parameter represented by a single fringe in any given geometry. By shifting the fringe in time or space, the directional ambiguity can be resolved and the dynamic range can be extended by keeping count of fringes as they pass, thus increasing the relative dynamic range. However, fringe shifting alone cannot overcome the problems resulting from the temporary loss of a fringe which occurs by a discontinuity in the measured quantity, i.e. a step in the surface of a solid object.

In accordance with one aspect of the present invention, there is provided an interferometer that utilizes a plurality of wavelengths to measure the surface characteristics of a solid or liquid such as, but not limited to, the position of the surface of the solid or liquid. The dynamic range of the interferometer is increased by the inclusion of multiple colors of monochromatic radiation into the same optical path. Preferably, three colors are used; however two colors are sufficient to exploit advantages of the improved interferometer, and more than three colors can produce various advantages in certain applications. The use of a plurality of colors enables the interferometer to obtain absolute displacement measurements. Preferably, the colors used in the interferometer are formed by three single longitudinal mode lasers of three different coherent emission wavelengths. As can be appreciated, other types of lasers can be use (i.e. the use of one or more modulated lasers that generate a plurality of wavelengths. When three or more wavelengths of light are used, two of the wavelengths preferably have a similar, but not exact, frequency and at least one of the remaining wavelengths has a wavelength frequency that is significantly different from the two wavelengths of light having a similar frequency. By selecting such a wavelength frequency relationship, the dynamic range of the interferometer is significantly increased. Preferably the wavelengths of light are selected from the visible range; however, one or more wavelengths can outside the visible light range.

In accordance with another aspect of the present invention, there is provided an interferometer that is able to detect the change in the direction of displacement of the surface of a solid or liquid as the solid or liquid is passed through an interference node. The detected change in direction of displacement is accomplished without the need of sophisticated and expensive acoustic optic modulators. The interferometer is designed to determine the direction of motion by taking the ratio of the intensities of the fringes of the different colors of light used by the interferometer. By selecting wavelengths that are not integer multiples of one another, the relative amount of intensity for each wavelength of light will have a different proportion on each side of the fringe node that arises from each wavelength of light. In addition, not all of wavelengths of light simultaneously pass through the intensity node at the same time. The fringes for each wavelength of light are thus formed by the light which is returned from the surface and then mixed with light of the same wavelength from the coherent laser which produced the particular wavelength.

In accordance with still another aspect of the present invention, there is provided an interferometer that includes the use of optics to improve the detection of fringe contrast. In one preferred embodiment, monomode optics are incorporated into the interferometer and at least partially function as low-pass spatial filters. The monomode optics allow the fringe contrast between light and dark fringes to approach their theoretical limit. One preferred monomode optic that can be used, but is not limited to, are single-mode optical fibers.

In accordance with yet another aspect of the present invention, there is provided an interferometer that includes a diffraction grating. The diffraction grating allows multiple wavelengths to be launched from optics onto a fluid or solid surface. In one preferred embodiment, the diffraction grating is transparent. In another preferred embodiment, the diffraction grating causes light passing through the diffraction grating to be approximately co-extensive and propagate in substantially the same direction. The light is preferably collimated light and directed at certain angles into the diffraction grating. The angle of the collimated light is chosen in connection with the period and blaze properties of the grating so that the collimated light will be approximately coextensive and propagate in substantially the same direction. In yet another preferred embodiment, the diffraction grating is used to launch more than one wavelength into one or more optic fiber. One such optic fiber can be a single-mode polarization preserving fiber; however, other types of optical fibers can be used. In another preferred embodiment, the diffraction grating is used to split the returned wavelength, which are made of a superposition of the incident wavelengths into their respective wavelength. The split wavelength can then be efficiently launched into individual optical fibers (i.e. single-mode polarization preserving fibers) by use of graded index (GRIN) lenses and/or micro-lenses. Preferably, the GRIN lenses and/or micro-lenses are attached to the ends of the fiber optic fibers; however, the GRIN lenses and/or micro-lenses can be spaced from the ends of the fiber optic fibers. In still another preferred embodiment, two pieces of diffraction grating are cut from the same diffraction grating to obtain the desired beam combination and later separation.

In accordance with still yet another aspect of the present invention, there is provided an interferometer that includes a polarizer. The positioning of a polarizer before the optical fibers in the return path of the wavelength ensures that the polarization of the wavelength entering the optical fibers is aligned with the polarization axis of the receiving optical fibers at a ratio of at least about 25 100:1. The polarizer helps to ensure that movements of the optical fibers (e.g. microphonics) results in a minimization or elimination of fluctuations in the intensity of the signal along the axis of interest. Since the reflected wavelength is transmitted with the reference signals in the fibers, and the relative ratios of such signals are analyzed, it is important that these the ratios are not corrupted by fiber movement. In one preferred embodiment, the ratio of the fringe intensities of different wavelengths of light passing through a polarizer are ratioed by using optics (i.e. single-mode polarization) and couplers to determine the absolute displacement of a surface relative to the position of the interferometer head.

In accordance with another aspect of the present invention, there is provided an interferometer that includes a GLAN prism. The GLAN prism is used to improve the polarization ratio of one or more wavelengths of light. In one preferred embodiment, the GLAN prism is positioned such that one or more of the reflected beams pass through a GLAN prism and into a diffraction grating substantially identical with the diffraction grating used for the input beam. The GLAN prism improves the polarization ratio of the wavelengths passing through the GLAN prism, which in turn allows for substantially accurate alignment of the polarization direction with the polarization-maintaining axis of each fiber, thereby reducing or preventing small movements or temperature fluctuations of the fibers from causing intensity fluctuations of the transmitted single-mode. In another preferred embodiment, a modified GLAN Thompson polarizer is used to increase the polarization ratio of the fiber input and/or output.

In accordance with still another aspect of the present invention, there is provided a method of obtaining the normal position of a surface of a solid or liquid with respect to a standard position to a resolution of about one millionth of the full dynamic range. The method is accomplished by the use of a plurality of wavelengths of light. Preferably three lasers having different wavelengths are used. The method is capable of providing absolute displacement measurements (i.e., it can be absolute with respect to the surface where the light exits the interferometer and is not dependent upon the previous relative position of the surface being measured).

In accordance with still yet another aspect of the present invention, the interferometer includes polarization preserving optical fibers which are single mode over about a factor of two to transmit three probe wavelengths to achieve the stated performance.

In accordance with another aspect of the present invention, the interferometer includes the use of a fourth light having a wavelength that is different from the other three sources of the light. The fourth light is preferably formed by a laser. The fourth light is transmitted into a fourth optical-fiber to monitor and/or compensate for the fiber length used to transmit the other three lights.

In accordance with still another aspect of the present invention, the interferometer includes a Fabry-Perot interferometric filter to separate two or more wavelengths that are close together.

In accordance with still yet another aspect of the present invention, separate wavelengths are used in the single mode range to measure small changes in the fiber length by depositing a coating which partially reflects the wavelength at the fiber ends. A piezoelectrically expandable mandrel is also preferably used to actively compensate the fiber length for unwanted changes.

In accordance with a further aspect of the present invention, the interferometer includes one or more optic stretchers to sweep the fringes in a controlled manner about a predetermined maximum rate of the crossing point of the interference fringes to increase the phase sensitivity by a factor of about 10 to 100. The optic stretchers can also be used to actively compensate the fiber length for unwanted changes.

In accordance with another aspect of the present invention, the interferometer includes two or more detectors in each receiving channel to reduce detector dead time effects and/or to minimize sources of noise not intrinsic to the scattered light.

In accordance with still another aspect of the present invention, the received signals are processed by cross and/or triple correlation to optimize signal processing efficiency, speed, sensitivity and/or to increase immunity to noise.

In one preferred aspect of the present invention, the interferometer exploits one or more optical wavelengths. Each wavelength is launched into a unique single-mode polarization-preserving fiber. The fiber is coupled to remove a fraction of the signal transmitted through the fiber and to send the wavelength along a second path, which wavelength will be later mixed with the returned wavelength. The wavelength of light from the initial launch fiber is directed into a GRIN lens or a microlens, which forms a collimated beam of light. The collimated beam is directed into a diffraction grating where the beam is rendered substantially collinear with the different wavelengths of light from the other fibers. The collimated beam from the diffraction grating is directed into a polarizing cube beam splitter. The beam splitter efficiently reflects the income wavelengths of light. The reflected lights is passed through a quarter-wave retarder which produces a circular polarization of the light. The light is then focused through one or more lenses on to the surface of either a liquid or solid. The quarter-wave plate does not perfectly circularize all the wavelengths of the light, but is sufficient for the polarizing cube beam splitter to function as an acceptably effective optical diode. The light that is reflected by the solid or liquid is circularly polarized in the opposite direction from the incident light. The direction of its linear polarization after a second passage through the quarter-wave plate is orthogonal to that of the incident light, and hence is predominately transmitted through the polarizing beam splitter, thereby taking a different path from the incident beam. The light then passes through a GLAN prism into a diffraction grating which is substantially identical to the diffraction grating used on the input beam. The GLAN prism improves the polarization ratio of all the wavelengths of the light. The improved polarization ratio allows for significantly accurate alignment of the polarization direction with the polarization-maintaining axis of each fiber, thereby reducing or preventing small movements or temperature fluctuations of the fibers from causing intensity fluctuations of the transmitted single-mode light. The light in each fiber is coherently mixed in each fiber coupler with the light which was earlier split off. The combined light results in interferometric beating. The beating is analyzed by coherently homodyning the optical modulation on the reflected beam down to a frequency that can be detected electronically by avalanche photo-diode detectors, pin diodes, and/or photo-multiplier tubes. The relative position of the surface with respect to the interferometer causes the single fringe visible by each detector to register and the intensity ranges from light to dark.

The improved interferometer has several advantages over prior interferometers. The improved interferometer can make absolute displacement measurements when using two or more wavelengths of light. The improved interferometer does not require expensive acousto-optic modulators to determine when the direction of displacement has changed as the moving surface is passing through an interference node. The direction of motion can be determined by taking the ratio of the intensities of the fringes of the different wavelengths of light used. The improved interferometer preferably includes single-mode fiber optics which act as low-pass spatial filters, and which allows the fringe contrast between light and dark fringes to approach its theoretical limit. The improved interferometer is designed to launch more than one wavelength of light from the fibers onto a fluid or solid surface by using a diffraction grating. This technique can also be used to launch more than one wavelength of light into a single-mode polarization preserving fiber. The diffraction grating can be used to split the returned light (which is a superposition of the incident wavelengths) into their respective wavelengths of light and then efficiently launch these wavelengths of light into individual single-mode polarization preserving fibers by use of graded index (GRIN) lenses or micro-lenses. The improved interferometer also preferably includes a polarizer positioned in the return light path before the optical fibers to ensure that the polarization of the light entering the fibers is aligned to the polarization axis of the receiving fibers at a ratio of at least about 100:1, thereby ensuring that movements of the fibers minimize or do not cause fluctuations in the intensity of the signal along the axis of interest. As can be appreciated, the polarizers can be used with a single wavelength for relative displacement interferometry to improve the accuracy of the measured signals.

The principal object of the present invention is to provide a method and apparatus that can accurately measure contoured surfaces.

It is another object of the present invention to provide an interferometer that can measure relative surface displacements over a wide range.

It is still another object of the present invention to provide an interferometer that can measure contoured surfaces that include steps and/or discontinuities.

It is yet another object of the present invention to provide an interferometer that reduces undesired intensity fluxuations.

It is still yet another object of the present invention to provide that reduces the effects of fringe contrast problems.

It is another object of the present invention to provide a multi-wavelength interferometer to measure contoured surfaces.

It is yet another object of the present invention to provide an interferometer which is absent expensive acousto-optic modulators.

It is still another object of the present invention to provide an interferometer that includes fiber optics to detect the reflected beams of light.

It is still yet another object of the present invention to provide an interferometer that includes polarizers to increase measurement accuracies.

It is another object of the present invention to provide an interferometer that includes a grating arrangement to permit multiple wavelength beam combination and separation.

It is still another object of the present invention to provide an interferometer that incorporates cross and/or triple correlation to process data to measure contoured surfaces.

It is still yet another object of the present invention to provide an interferometer having polarization preserving optical fibers to improve the performance of the interferometer.

It is another object of the present invention to provide an interferometer that monitors and/or compensates for the fiber length of the optics used in the interferometer.

It is yet another object of the present invention to provide an interferometer that can separate two or more wavelengths that are very close together.

It is yet another object of the present invention to provide an interferometer that can measure small changes in the fiber length.

It is yet another object of the present invention to provide an interferometer that can increase the phase sensitivity of the interferometer.

It is still yet another object of the present invention to provide an interferometer that reduces detector dead time effects.

It is still yet another object of the present invention to provide an interferometer that minimizes sources of noise not intrinsic to the scattered light.

It is still yet another object of the present invention to provide an interferometer that accurately measures contoured surfaces, is simple to operate and is economical to manufacture.

These and other objects and advantages will become apparent to those skilled in the art upon the reading and following of the description taken together with the accompanied drawings.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF THE PREFERRED EMBODIMENT

Figure 1:
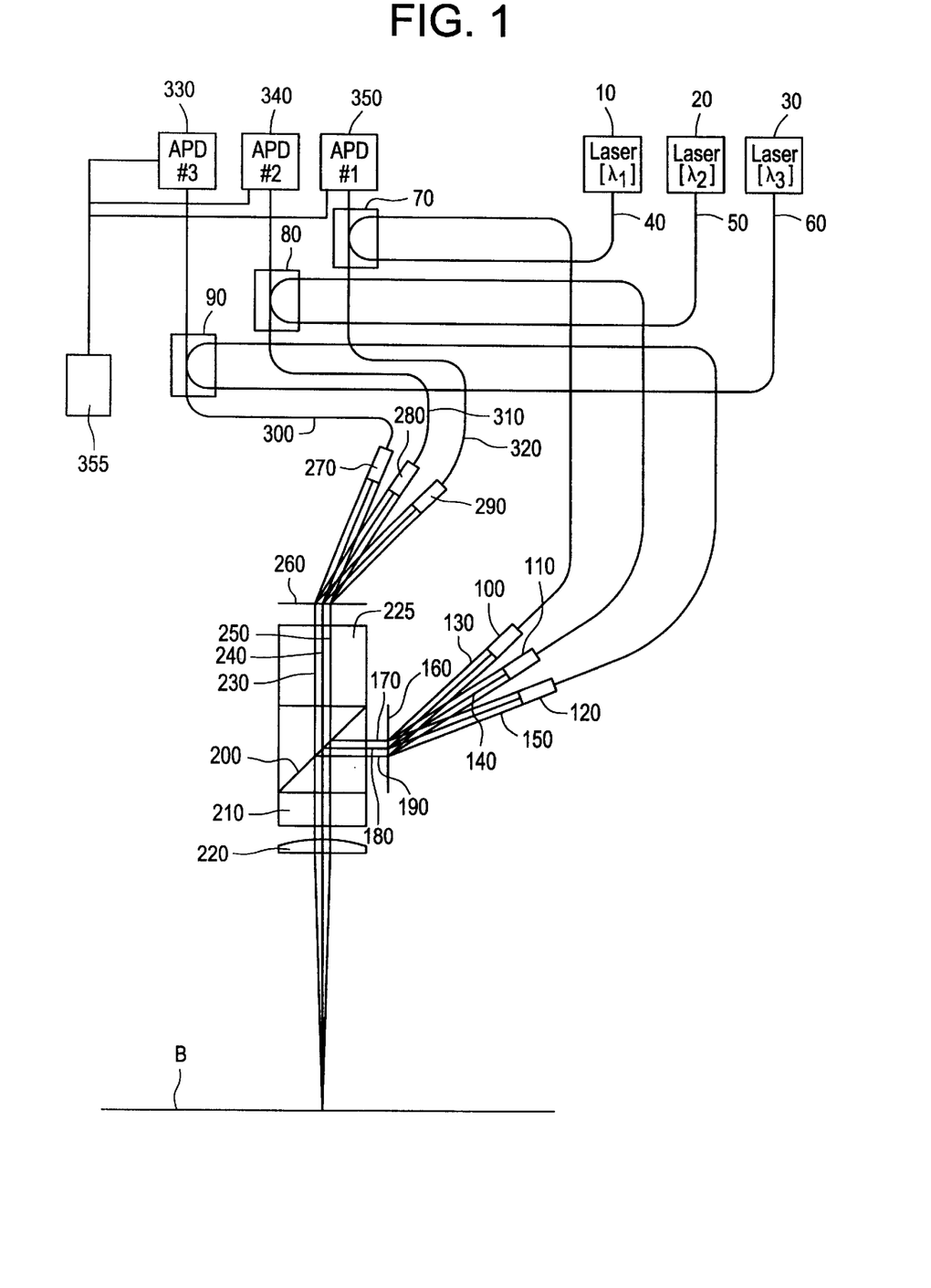
FIG. 1 is a schematic representation of the three-color interferometer for displacement measurement and contouring of solid surfaces in accordance with the present invention.
Figure 2:
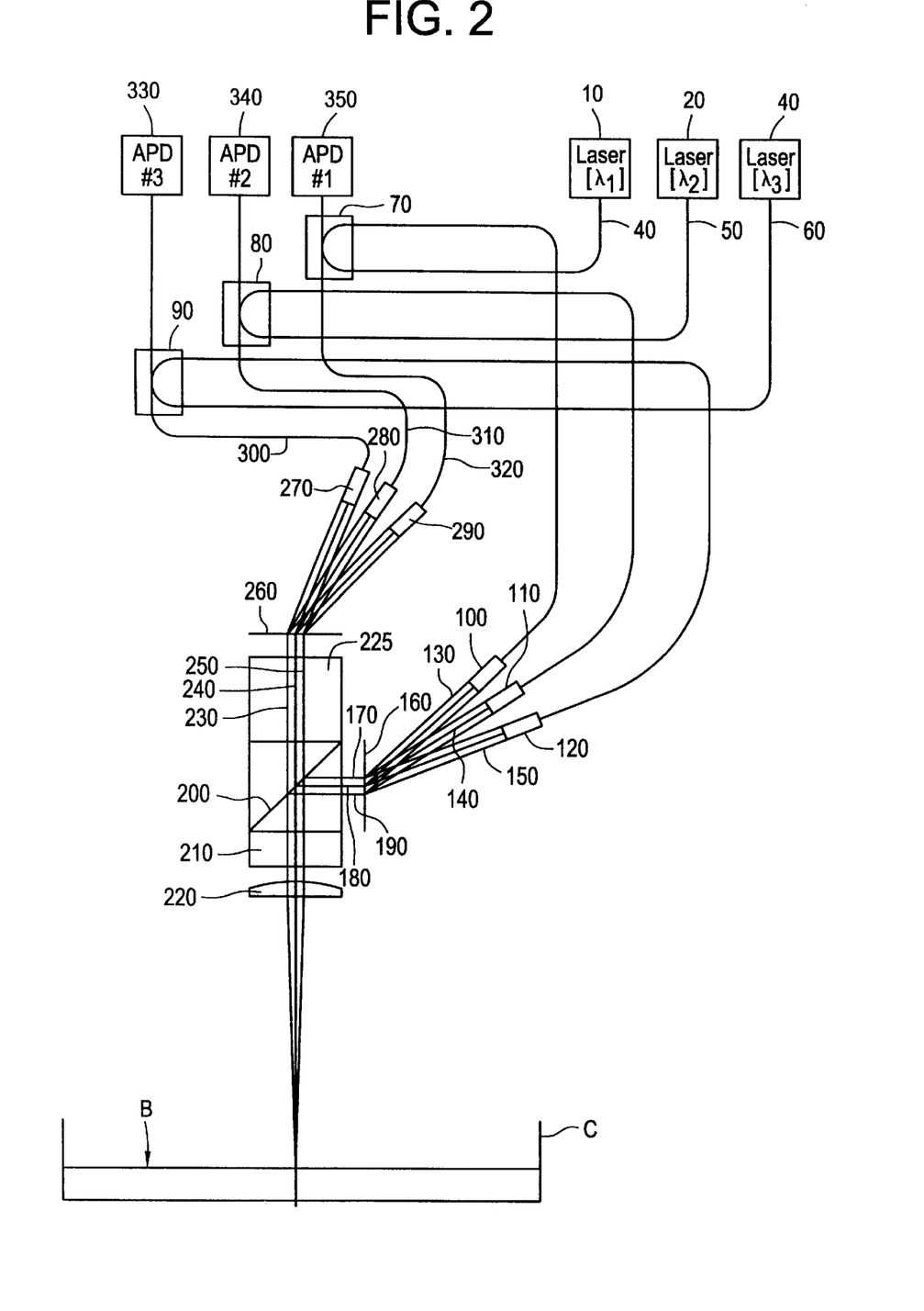
FIG. 2 is a schematic representation of the three-color interferometer for displacement measurement and contouring of liquid surfaces in accordance with the present invention.

Referring now to the drawings, wherein the showings are for the purpose of illustrating the preferred embodiments of the invention only and not for the purpose of limiting the same, in FIGS. 1 and 2 there is illustrated an interferometer in accordance with the present invention. FIG. 1 illustrates the interferometer detecting and measuring a characteristic of a solid or semi-solid object. One such characteristic is the surface topography of the solid or semi-solid object; however, other characteristics of the solid or semi-solid object can be measured and observed by the interferometer. FIG. 2 illustrates the interferometer detecting and measuring a characteristic of a liquid object. One such characteristic that is movement of the liquid surface to determine the viscosity of the liquid; however, other characteristics of the liquid can be measured and observed by the interferometer. The solid, semi-solid or liquid object can be a non-transparent, semi-transparent or transparent. The components of the interferometer illustrated in FIGS. 1 and 2 are essentially the same, thus will be simultaneously described. FIG. 1 will only be referred to; however, the discussion relating to FIG. 1 also relates to FIG. 2.

Referring now to FIG. 1, the interferometer is shown as including three light sources. As can be appreciated, many of the inventive aspects of the present invention can be incorporated in an interferometer having less than three light sources or more than three light sources. The light sources 10, 20, 30 are shown as being generated by three separate lasers, each having a distinct wavelength. Preferably the lasers are single longitudinal mode lasers. As can be appreciated, other light sources can be used. The wavelength of light generated by laser 10 is less than the wavelength of light generated by laser 20. Laser 30 is selected to generate a wavelength of light that is greater than the wavelength of light generated by laser 20. Preferably, lasers 10 and 20 generate closely spaced wavelengths of light and laser 30 generates a wavelength of light that is much greater than the wavelengths of light generated by lasers 10 and 20. Preferably, the ratio of wavelengths of light from lasers 10 and 20 is about 0.85–1:1. Preferably, the ratio of wavelengths of light from lasers 30 and 20 is at least about 1.5:1. This specific selection of wavelengths of light permits the coverage of as large as practicable a "repeat frequency" in the composite fringe pattern.

The light from each of the three lasers 10, 20, 30 is launched respectively into three optic fibers 40, 50, 60. The optic fibers preferably include single-mode polarization preserving fibers of substantially identical type. Several types of fibers which can be used include step- or graded index core, stress birefringence, "bow-tie", or some other similar construction that achieves the required optic properties. As shown in FIG. 1, each of optic fibers 40, 50, 60 are passed through wave couplers 70, 80, 90. The wave couplers are designed to extract a portion of the transmitted laser light energy that is passing through optic fibers 40, 50, 60. Preferably, the wave couplers are coherent evanescent wave couplers and extract only a small amount of the laser light energy being transmitted in the optic fibers. The extracted laser light can be used as a local oscillator (homodyne or heterodyne according to the preferred usage in the field of application) to the signal scattered from the test object, as will be further discussed in detail. The remainder of the coherently transmitted laser light, whose field properties are constrained to be pure single-transverse mode, is transmitted to the end of the optic fibers.

As illustrated in FIG. 1, lenses are positioned on the ends of the optic fibers or closely adjacent to the ends of the optic fibers. Preferably, graded index (GRIN) lens 100, 100, 120 are coupled to the ends of each optic fibers. Preferably, the graded index (GRIN) lens are quarter-pitch GRIN lens. The GRIN lens are designed to at least partially collimate the laser light at the end of the optic fibers. The collimated light 130, 140, 150 is directed at a certain angle to a diffraction grating 160. Preferably the diffraction grating is transparent. Each angle of the collimated laser light is chosen in connection with the period and blaze properties of the grating so that the three collimated beams of light 130, 140, 150 produce beams of light 170, 180, 190 that are approximately co-extensive and propagate in substantially the same direction.

The three co-extensive light beams 170, 180 190 have a polarization that is well oriented by the rotation of the optics 40, 50, 60, and have launch and emission orientations that are sensitive to initial assembly, but do not vary thereafter. The three substantially co-extensive light beams 170, 180 190 are directed through a polarizing beamsplitter 200 and are deflected downward at approximately right angles as light beams 170, 180 190 pass through the beamsplitter. An optical retarder 210 is positioned at the base of beamsplitter 200. The optical retarder is preferably a quarter wave retarder which affects light beams 170, 180, 190 substantially the same. The quarter wave retarder produces an approximately quarter circular polarization on the three light beams whose reflected intensities are less critically dependent upon the surface reflectivity than linear polarized wavelengths. Due to these properties of light beams 170, 180, 190, beamsplitter 200 essentially reflects all of the collimated light 130, 140, 150 and transmits essentially all of the light that is reflected back from a surface through beamsplitter 200, as will be further discussed in detail. As a result, the efficiency of the interferometer is significantly increased (i.e. at least by a factor of four over a conventional 50% beamsplitter) and excellent measurements from surfaces which may reflect or scatter very little light, (i.e. surfaces with only small refractive index discontinuities) can be obtained.

Once light beams 170, 180, 190 pass through optical retarder 210, the beams of light pass through one or more lenses 220 or other wave-front conditioning device. Len 220 prepares light beams 170, 180, 190, which consists of three colors each having wave-fronts that are temporally coherent and spatially coherent, for interaction with the surface of object B to be measured. As shown in FIG. 1, the light beams are focused onto the surface of object B. Preferably, lens 220 is positioned about 100 mm from the surface of object B; however, other distances can be used. Object B is a solid or semi-solid object as shown in FIG. 1, and a liquid as shown in FIG. 2. As illustrated in FIG. 2, liquid B is maintained in a container C. Referring again to FIG. 1, the focused light beams contact the surface of object B and a portion of the light beams is reflected back through lens 220. Lens 220 preferably reconfigures the reflected or scattered light 230, 240, 250 to have geometrical properties that are analogous to the properties of light beams 170, 180, 190. Due to the essential reciprocality of the Van Cittert-Zernike relationship, the collection aperture will include typically only one 'speckle' and thus retain high contrast modulation of the collected light. The wave-front conditioning device could include a single run of optical-fiber having similar properties as the optical-fibers in optic fibers 40, 50, 60. This type of wave-front conditioning device is particularly useful if the probed sample is inaccessible or in regions of a high magnetic field; (i.e. where electronic component performance would be impaired). As can be appreciated, this configuration may cause differential dispersion between the three wavelengths, and thus may require compensation.

Referring again to FIG. 1, the collected reflected light 230, 240, 250 passes through lens 220 and through optical retarder 210. The optical retarder restores the linearity of polarization of reflected light 230, 240, 250. The restored linearity of the reflected light enables the reflected light to pass through the polarization sensitive beamsplitter 200 without being reflected by beamsplitter 200.

The reflected light 230,240,250 upon leaving beamsplitter 200 passes through GLAN prism 225. GLAN prism 225 improves the polarization ratio of the reflected light to permit sufficiently accurate alignment of the polarization direction with the polarization-maintaining axis of each optic fiber to prevent small movements or temperature fluctuations of the optic fibers from causing intensity fluctuations of the transmitted single-mode. Preferably the GLAN prism is a modified GLAN Thompson polarizer which increases the polarization ratio of the fiber input and/or output.

The reflected light which passes through the GLAN prism passes into a diffraction grating 260. The diffraction grating is selected to be substantially the same or identical to diffraction grating 160. The diffraction grating is designed to deflect the reflected light into lenses 270, 280, 290. The lenses are preferably GRIN lenses having substantially the same properties as GRIN lenses 100, 110, 120. The reflected light passes through the GRIN lenses into optic cables 300, 310, 320. The optic fibers preferably have substantially the same properties as optic fibers 40, 50, 60. The single-mode properties of the optic fibers permit only a zero-order transverse mode to propagate through the fiber, thus forcing the satisfaction of the van Cittert-Zernike relationship. The permitting of only a zero-order transverse mode to propagate through the fiber maximizes the contrast of coherent interference.

Optic fibers 300, 310, 320 direct the reflected light to wave couplers 90, 80, 70, respectively. Most of the reflected light that is transmitted through optic cables 300, 310, 320 is coherently mixed with the portion of light that was extracted from optic fibers 40, 50, 60. Although the amount of light that is extracted from optic fibers 40, 50, 60 is typically only a small amount, this small amount is nevertheless much larger than the amount of transmitted reflected light. A typical ratio for good homodyne amplification is about 100 to 1000, although ratios outside this range are acceptable. After the reflected light is passed through the wave couplers, the light is directed by optic fibers 300, 310, 320 to detectors 330, 340, 350, respectively. The detectors preferably include avalanche photo diodes; however this type of detector is not required since individual quantum detection is not essential in a system whose detected intensity is amplified by homodyne gain. The "shot noise", which is actually the inevitable quantization of the scattered optical field, cannot be substantially improved, even under the semi-classical approximation. However, the detection level has now been raised so that "shot noise" is the only significant source of noise, provided that the laser "noise" is sufficiently low and the following electronics are carefully designed and constructed.

By comparing the relative phases of the three wavelengths of laser light, the optical path length may be determined within the lowest common multiple of the three wavelengths. The exact and absolute position may easily be determined against a calibrated reference that is immune to temporary loss of signal, for whatever reason. Preferably, the received signals are processed in circuit 355, such as a computer, by cross and/or triple correlation to optimize signal processing efficiency, speed, sensitivity and immunity to noise.

In general, the optical fibers are installed to have a common run so that all changes in length or properties are substantially the same for all fibers. In cases where it is impractical to maintain the same fiber length and/or same optic properties, the fiber lengths can be adjusted; using for example a piezoelectric mandrel around which each fiber is wrapped as part of its run.

Figure 3:
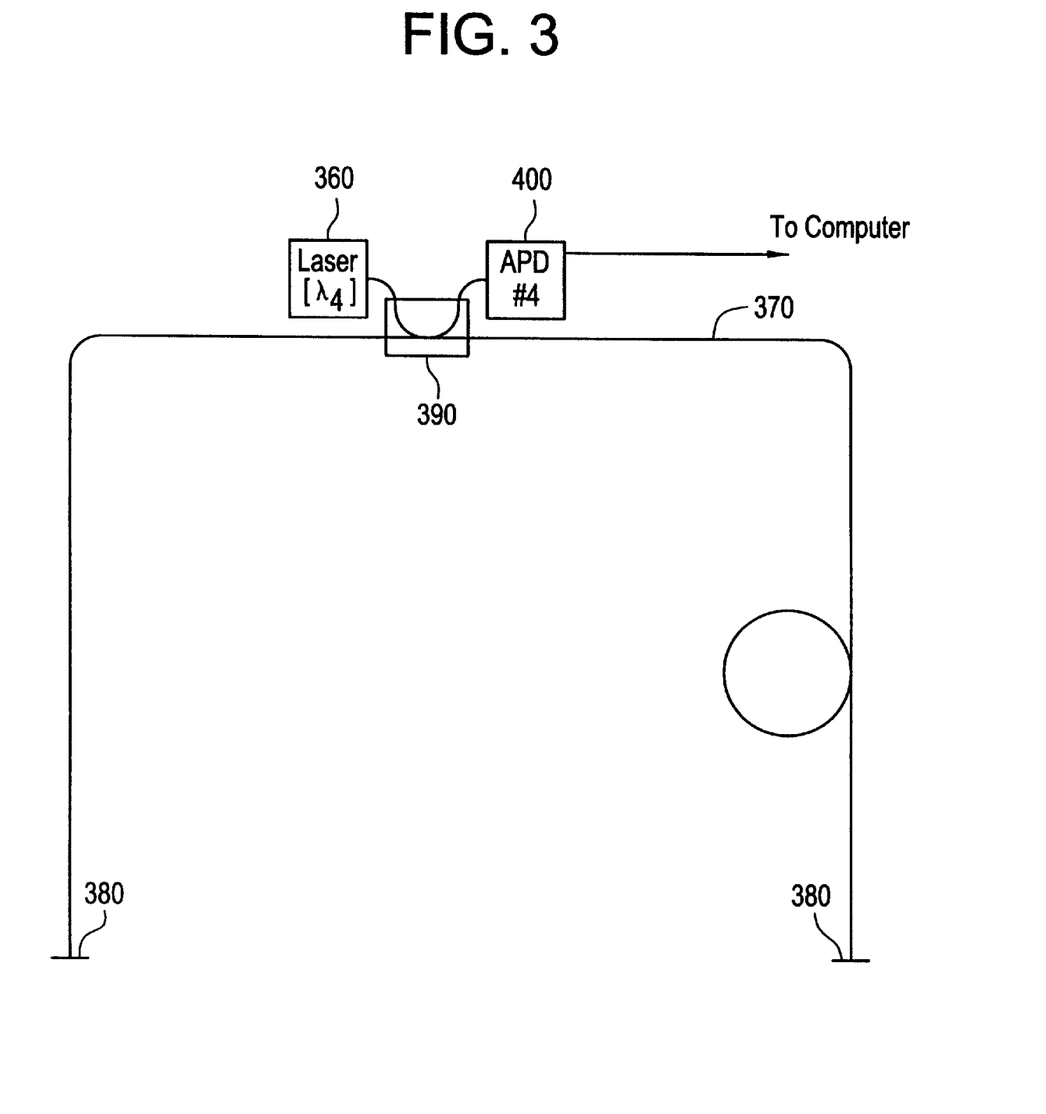
FIG. 3 is a schematic representation of an alternate embodiment of the present invention which incorporates a fourth color light.

Referring now to FIG. 3, an arrangement for creating an error signal for an active control system is disclosed. As shown in FIG. 3, the error signal is obtained by using a fourth laser 360. Laser 360 preferably generates a wavelength of light that is different from the wavelengths of light from lasers 10, 20, 30. Laser 360 directs light into an optic fiber 370. The optic fiber is designed so that both fiber ends include a reflective coating 380. A wave coupler 390 and light detector 400 are also included in the system. The wave coupler is preferably similar to wave couplers 70, 80, 90 and detector 400 is preferably similar to detectors 330, 340, 350. The error signal system preferably is temporally coherent to the extent necessary to stabilize the fiber length, and also should be within a factor of two of the wavelengths of light from the laser for which the fiber is single mode. The stabilization can be held within a very small fraction of a fringe, but can become ambiguous under length changes of more than one half wavelength of light of the fourth laser. As can be appreciated, other error signal system arrangements can be used.

The maximum dynamic range covered by using two adjacent emission lines of the order of tens of GHz apart of a laser diode is of the order of a few centimeters or tens of centimeters. A third laser wavelength, somewhat further separated, permits a subdivision of the full dynamic range into small segments. For example, a conservative estimate of the measurement accuracy of phase is about 1% (more reasonable 0.1% is achievable), permitting the division of the few centimeters of dynamic range into either about one micron, in the first case, or about 10 nm in the second case. A dynamic range of a million is thus readily possible over a range that is determined by the choice of laser wavelengths and their separations.

The invention described herein provides a hardware design which will make it possible to make absolute displacement measurements in the sub-nanometer to meter range. It may be applicable to coordinate measuring machines, especially where physical contact with the surface is undesirable. This technique is also applicable where the surface in question is inaccessible, soft, chemically reactive or has an extremely high or low temperature. Because of the extreme dynamic range and resolution of the measurements by the interferometer, a simple and robust implementation is also directly applicable from civil engineering to nanotechnology.

The invention has been described with reference to a preferred embodiment and alternatives thereof. It is believed that many modifications and alterations to the embodiments disclosed will readily suggest itself to the those skilled in the art upon reading and understanding the detailed description of the invention. It is intended to include all such modifications and alterations insofar as they come within the scope of the present invention.

We claim:

1. An optical device for measuring a surface characteristic of an object comprising:
   a. a light beam source that produces light;
   b. an optic fiber to transport said light;
   c. a wave coupler to extract a portion of said light from said optic fiber;
   d. a polarizing beamsplitter to deflect said light emanating from said optic fiber to said object surface and to allow light reflected from said object to pass through said beamsplitter in a substantially unaltered manner;
   e. an optical retarder creating circular polarization on said emanating light; and
   f. a secondary light beam source producing a wavelength of light that is transmitted in a secondary optic fiber to produce an error signal to compensate for the length of said optic fiber and said return optic fiber.

2. An optical device as defined in claim 1, wherein said light beam source includes a plurality of lasers, each of said lasers producing a light having a separate and distinct wavelength.

3. An optical device, as defined in claim 2, wherein said light beam source includes a first, second and third laser, said first and second lasers producing light having closely spaced wavelengths, said third laser producing light having a wavelength widely spaced from said wavelengths of light from said first and second lasers, said wavelengths of light from said three lasers being non-integer multiples of one another.

4. An optical device as defined in claim 1, wherein said optic fiber being a monomode polarization preserving optic fiber.

5. An optical device as defined in claim 1, wherein said optical retarder being a quarter wave optical retarder.

6. An optical device as defined in claim 1, including a GRIN lens to at least partially culminate said emanated light.

7. An optical device as defined in claim 6, wherein said GRIN lens is connected to an end of said optic fiber.

8. An optical device as defined in claim 1, including a diffraction grating to at least partially align said emanated light onto said beamsplitter.

9. An optical device as defined in claim 1 including a lens positioned between said optical retarder and said object to focus said emanating light to a narrow point on said object.

10. An optical device as defined in claim 1, including a GLAN prism to improve the polarization of said reflected light.

11. An optical device as defined in claim 1, including a return optic fiber to receive reflected light and to transport said reflected light to a detector.

12. An optical device as defined in claim 11, including GRIN lens positioned at least closely adjacent to said return optic fiber to at least partially culminate said reflected light.

13. An optical device as defined in claim 11, including a diffraction grating to at least partially align said reflected light onto said return optic fiber.

14. An optical device as defined in claim 11, wherein said wave coupler combines said extracted light with said reflected light in said return optic fiber.

15. An optical device as defined in claim 11, wherein said detector includes at least one light detector selected from the group consisting of an avalanches photo diode, a pin diode, a photo-multiplier tube.

16. An optical device as defined in claim 11, wherein said detector including a plurality of light detectors.

17. An optical device as defined in claim 11, including a correlator to cross or triple correlate signals received from said detector.

18. An optical device as defined in claim 11, including optic stretchers to increase the phase sensitivity of said return optic fiber.

19. An optical device as defined in claim 1, including a Fabry-Perot to separate closely spaced wavelengths.

20. An optical device for measuring absolute displacement and contouring of an object surface comprising:
   a. A light beam source including three lasers, each of said lasers producing separate and distinct wavelengths of light, said first and second lasers producing closely spaced wavelengths of light, said third laser producing a wavelength of light widely spaced from said light wavelengths of said first and second lasers, said light wavelengths of said three lasers being non-integer multiples of one another;
   b. three optic fibers, said first, second and third optic fibers transporting light from said first, second and third lasers, respectively;
   c. three wave couplers to extract a portion of said light from said first, second and third optic fibers, respectively;
   d. a diffraction grating to receive light emanating from said three optic fibers, said diffraction grating causing said three wavelengths of light to propagate in substantially the same direction after passing through said diffraction grating;
   e. a polarizing beamsplitter to deflect said light passing through said diffraction grating toward said object surface and to allow light reflected from said object to pass through said beamsplitter in a substantially unaltered manner;
   f. an optical retarder to circularly polarize said light prior to contacting said object;
   g. a GLAN prism to polarize light reflected from said object surface to improve the polarization ration of said reflected light;
   h. three return optic fibers, said first, second and third optic fibers receiving and transporting said first, second and third reflected wavelengths of light, respectively;
   i. three detectors to detect said reflected light and said extracted light; and
   j. a correlator to correlate data received from said three detectors.

21. An optical device as defined in claim 20, wherein said optic fiber being a monomode polarization preserving optic fiber.

22. An optical device as defined in claim 20, wherein said optical retarder being a quarter wave optical retarder.

23. An optical device as defined in claim 20, including a GRIN lens to at least partially culminate said emanated light.

24. An optical device as defined in claim 20 including a lens positioned between said optical retarder and said object to focus said emanating light to a narrow point on said object.

25. An optical device as defined in claim 20, including GRIN lens positioned at least closely adjacent to said return optic fiber to at least partially culminate said reflected light.

26. An optical device as defined in claim 20, including a diffraction grating to at least partially align-said reflected light onto said return optic fiber.

27. An optical device as defined in claim 20, wherein said wave coupler combines said extracted light with said reflected light in said return optic fiber.

28. An optical device as defined in claim 20, including a correlator to cross or triple correlate signals received from said detector.

29. An optical device as defined in claim 20, including optic stretchers to increase the phase sensitivity of said return optic fiber.

30. An optical device as defined in claim 20, including a Fabry-Perot to separate closely spaced wavelengths.

31. An optical device as defined in claim 20, including a secondary light beam source producing a wavelength of light that is transmitted in a secondary optic fiber to produce an error signal to compensate for the length of said optic fiber and said return optic fiber.

32. A method of providing absolute displacement measurements of the surface of an object comprising the steps of;
  a. providing at least a first and second laser, each of said lasers producing a light having a separate and distinct wavelength;
  b. circularly polarizing said light from said lasers;
  c. providing an optical device which affects light reflected from said object different from non-reflected light;
  d. combining said reflected light with non-reflected light to produce interferometric beating;
  e. analyzing said interferometric beating by coherent homodyning; and
  f. using a secondary laser and an secondary optical fiber to provide error compensation.

33. The method as defined in claim 32, including three lasers, said first and second lasers producing light having closely spaced wavelengths, said third laser producing a light having a wavelength widely spaced from said lights from said first and second lasers.

34. The method as defined in claim 32, wherein said optical device is a polarizing beamsplitter.

35. The method as defined in claim 32, wherein said lights are circularly polarized by a quarter-wave optical retarder.

36. The method as defined in claim 32, including single-mode polarization maintaining optical fibers.

37. The method as defined in claim 32, including a diffraction grating to cause said light from said three lasers to propagate in substantially the same direction.

38. The method as defined in claim 32, including an optical device to improve the polarization ration of said reflected light.

39. The method as defined in claim 38, wherein said optical device is a GLAN prism.

40. The method as defined in claim 32, wherein said step of combining reflected and nonreflected light includes a light wave coupler.

41. The method as defined in claim 32, wherein said step of analyzing includes cross or triple correlating said interferometric beating that is detected by a plurality of detectors.

* * * * *